US011644810B2

United States Patent
Fujieda et al.

(10) Patent No.: US 11,644,810 B2
(45) Date of Patent: May 9, 2023

(54) HYBRID RENDERING HMI TERMINAL DEVICE

(71) Applicant: Toshiba Mitsubishi-Electric Industrial Systems Corporation, Tokyo (JP)

(72) Inventors: Hiroyuki Fujieda, Tokyo (JP); Nobuo Shimizu, Tokyo (JP); Akira Nojima, Tokyo (JP); Kyohei Miyake, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 29 days.

(21) Appl. No.: 17/056,429

(22) PCT Filed: Oct. 31, 2018

(86) PCT No.: PCT/JP2018/040489
§ 371 (c)(1),
(2) Date: Nov. 18, 2020

(87) PCT Pub. No.: WO2020/090028
PCT Pub. Date: May 7, 2020

(65) Prior Publication Data
US 2021/0208562 A1 Jul. 8, 2021

(51) Int. Cl.
*G05B 19/05* (2006.01)
*G06F 3/14* (2006.01)

(52) U.S. Cl.
CPC ............ *G05B 19/058* (2013.01); *G06F 3/14* (2013.01); *G05B 2219/13144* (2013.01); *G05B 2219/14006* (2013.01)

(58) Field of Classification Search
CPC ........ G05B 19/058; G05B 2219/13144; G05B 2219/14006; G06F 3/14
See application file for complete search history.

(56) References Cited

U.S. PATENT DOCUMENTS 8,817,021 B1 * 8/2014 Hickman ................ G06T 15/00
345/426
10,070,657 B1 * 9/2018 Chappell .............. A22B 5/0035
(Continued)

FOREIGN PATENT DOCUMENTS

JP 2017-27211 A 2/2017

OTHER PUBLICATIONS

Office Action dated Dec. 6, 2021, in corresponding Indian patent Application No. 202017047563, 5 pages.
(Continued)

*Primary Examiner* — Sing-Wai Wu
*Assistant Examiner* — Khoa Vu
(74) *Attorney, Agent, or Firm* — Xsensus LLP

(57) ABSTRACT

A hybrid rendering HMI terminal device (32) is provided with a web browser (321) and an HMI Web Runtime (322). The web browser (321) displays an HMI screen on which a first part and a second part that represent the state of a monitoring target device (7) are arranged. When signal data from the monitoring target device (7) is analog numerical data, a WebGL rendering processing unit (322i) renders the first part associated with the signal data by WebGL rendering. When signal data from the monitoring target device (7) is data other than analog numerical data, an SVG rendering processing unit (322h) renders the second part associated with the signal data by SVG rendering.

11 Claims, 6 Drawing Sheets

(56) References Cited

U.S. PATENT DOCUMENTS

| | | | |
|---|---|---|---|
| 2009/0089225 A1* | 4/2009 | Baier | G06Q 10/06 706/12 |
| 2011/0166677 A1* | 7/2011 | Bromley | G05B 19/409 700/83 |
| 2012/0127165 A1 | 5/2012 | Evans et al. | |
| 2015/0100892 A1 | 4/2015 | Cronin et al. | |
| 2015/0261422 A1* | 9/2015 | den Haring | G05B 23/0272 715/800 |
| 2017/0062009 A1* | 3/2017 | Clifton | G11B 27/031 |
| 2017/0126843 A1* | 5/2017 | Pantea | G06T 11/206 |
| 2019/0149772 A1* | 5/2019 | Fernandes | G06F 3/0486 348/159 |

OTHER PUBLICATIONS

International Search Report and Written Opinion dated Jan. 8, 2019 for PCT/JP2018/040489 filed on Oct. 31, 2018, 6 pages including English Translation of the International Search Report.

* cited by examiner

HYBRID RENDERING HMI TERMINAL DEVICE

CROSS-REFERENCE TO RELATED APPLICATION

The present application is based on PCT filing PCT/JP2018/040489, filed Oct. 31, 2018, the entire contents of which are incorporated herein by reference.

FIELD

The present invention relates to a hybrid rendering HMI terminal device in which a SCADA HMI runs on a web browser.

BACKGROUND

Supervisory Control And Data Acquisition (SCADA) is known as a mechanism that performs supervisory control of social infrastructure systems. The social infrastructure systems include a steel rolling system, a power transmission and transformation system, a water and sewage treatment system, a building management system, a road system, and the like.

SCADA is a type of industrial control system that performs system monitoring and process control by computer. In SCADA, a quick responsiveness (real-time property) in accordance with system processing performance is necessary.

SCADA is usually composed of the following subsystems.

(1) HMI (Human Machine Interface)

An HMI is a mechanism that presents data of a target process (monitoring target device) to an operator and allows the operator to monitor and control the process. For example, in PTL 1, a SCADA HMI including an HMI screen that runs on a SCADA client is disclosed.

(2) Supervisory Control System

A supervisory control system collects signal data on a process and transmits a control command to the process. It is constituted of a programmable logic controller (PLC), and the like.

(3) Remote Input/Output Device (Remote Input Output: RIO)

A remote input/output device, which is connected with a sensor installed within the process, converts a signal of the sensor into digital data and transmits the digital data to the supervisory control system.

(4) Communication Base

A communication base connects the supervisory control system and the remote input/output device.

CITATION LIST

Patent Literature

[PTL 1] JP 2017-27211 A

SUMMARY

Technical Problem

When a SCADA HMI that operates an HMI screen on a Web browser is constructed, the HMI screen is displayed by having a drawing in an SVG format read in a DOM managed by a web browser. When a change to an svg element in the DOM has been made so as to change the color of a part on the HMI screen, the web browser detects the change and updates the HMI screen. The rendering performance of such SVG rendering presents a low speed and DOM garbage collection (GC) easily occurs; in this case, a display delay will occur.

Furthermore, a device to be monitored by SCADA runs and changes at a high speed in some cases. On a SCADA HMI of a system for such, it is required to display signal data from the monitoring target device at a high speed. However, a system of the SVG rendering described above cannot meet this requirement.

The present disclosure has been made in order to solve the above-mentioned problems and it is an object of the present disclosure to provide a hybrid rendering HMI terminal device capable of displaying, without delay, an HMI screen that runs on a web browser.

Solution to Problem

In order to achieve the above object, a hybrid rendering HMI terminal device according to the present disclosure is configured as follows.

The hybrid rendering HMI terminal device according to the present disclosure includes a web browser, a Web Graphics Library (Web GL) rendering processing unit, and an SVG rendering processing unit.

The web browser displays an HMI screen on which a first part and a second part that represent the state of a monitoring target device are arranged. The first part is a part that displays analog numerical data. The second part is a part that displays data other than analog numerical data.

When signal data from the monitoring target device is analog numerical data, the WebGL rendering processing unit renders the first part associated with the signal data by WebGL rendering. Preferably, the WebGL rendering pre-renders fonts necessary for a string representation of numerical data in an offcanvas area (main memory area). Then, it renders the first part by transferring a string representing the analog numerical data from the offcanvas area (the main memory area) to a canvas area (GPU memory area) by using a texture mapping function of WebGL.

When signal data from the monitoring target device is data other than analog numerical data, the SVG rendering processing unit renders the second part associated with the signal data by SVG rendering. The SVG rendering renders the second part by updating an svg element in the DOM managed by a web browser.

Advantageous Effects of Invention

According to the present disclosure, a hybrid rendering system including both the WebGL rendering that exhibits high rendering performance and the SVG rendering that contributes to reducing the development cost of an HMI is employed and thereby the HMI screen running on the web browser can be displayed without delay and the SCADA HMI can be efficiently developed.

DESCRIPTION OF EMBODIMENTS

Figure 1:
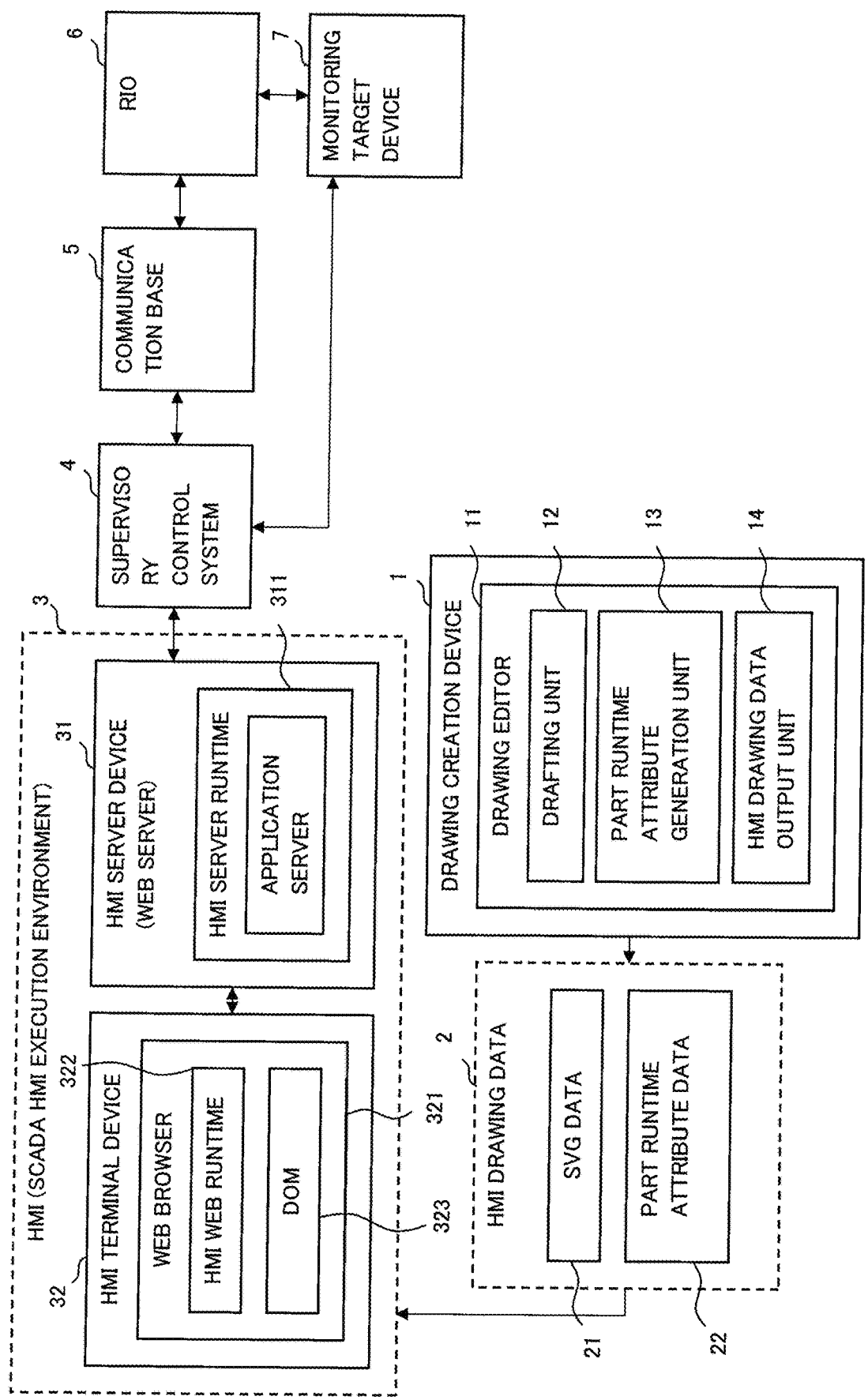
FIG. 1 is a diagram showing a system configuration of SCADA.

Hereinafter, an embodiment of the present disclosure will be described in detail with reference to drawings. However, when numbers such as the number, quantity, volume, or range of elements are referred to in the embodiment presented below, the present disclosure is not limited by the numbers referred to except where especially explicitly specified and where explicitly specified to the numbers in principle. In addition, structures and the like that are described in the embodiments presented below are not necessarily required for this disclosure except where especially explicitly specified and where obviously specified thereto in principle. It should be noted that common elements in the drawings are denoted by the same reference signs to omit redundant explanations.

First Embodiment

<Whole System>

FIG. 1 is a diagram showing a system configuration of SCADA. The SCADA includes an HMI 3, a supervisory control system 4, a communication base 5, and an RIO 6 as subsystems; and connects to a monitoring target device 7. Herein, the HMI 3 that is a SCADA HMI execution environment and a drawing creation device 1 that is a SCADA HMI development environment are inclusively referred to as a SCADA Web HMI system.

The supervisory control system 4, the communication base 5, and the RIO 6 are as described in Background and therefore, their descriptions will be omitted. The monitoring target device 7 includes a sensor, an actuator, and the like that constitute a plant to be monitored and controlled.

The drawing creation device 1 includes a drawing editor 11. The drawing creation device 1 which is a development environment generates HMI drawing data 2 by the drawing editor 11. The HMI drawing data 2 includes scalable vector graphics (SVG) data 21, which is vector data, and part runtime attribute data 22.

The HMI 3 (HMI subsystem) includes an HMI server device 31 and an HMI terminal device 32. The HMI 3 which is an execution environment operates as an HMI subsystem in coordination between an HMI Web Runtime 322 (web application) that reads the HMI drawing data 2 and runs on a web browser 321 and an HMI Server Runtime 311.

<Drawing Creation Device>

The drawing editor 11 included in the drawing creation device 1 has an advanced drawing editing function and a function that allows drawing data to be saved in SVG format. The drawing editor 11 is, as one example, Microsoft Visio (registered trademark).

The drawing editor 11 which runs on the drawing creation device 1 includes a drafting unit 12, a part runtime attribute generation unit 13, and an HMI drawing data output unit 14.

Figure 6:
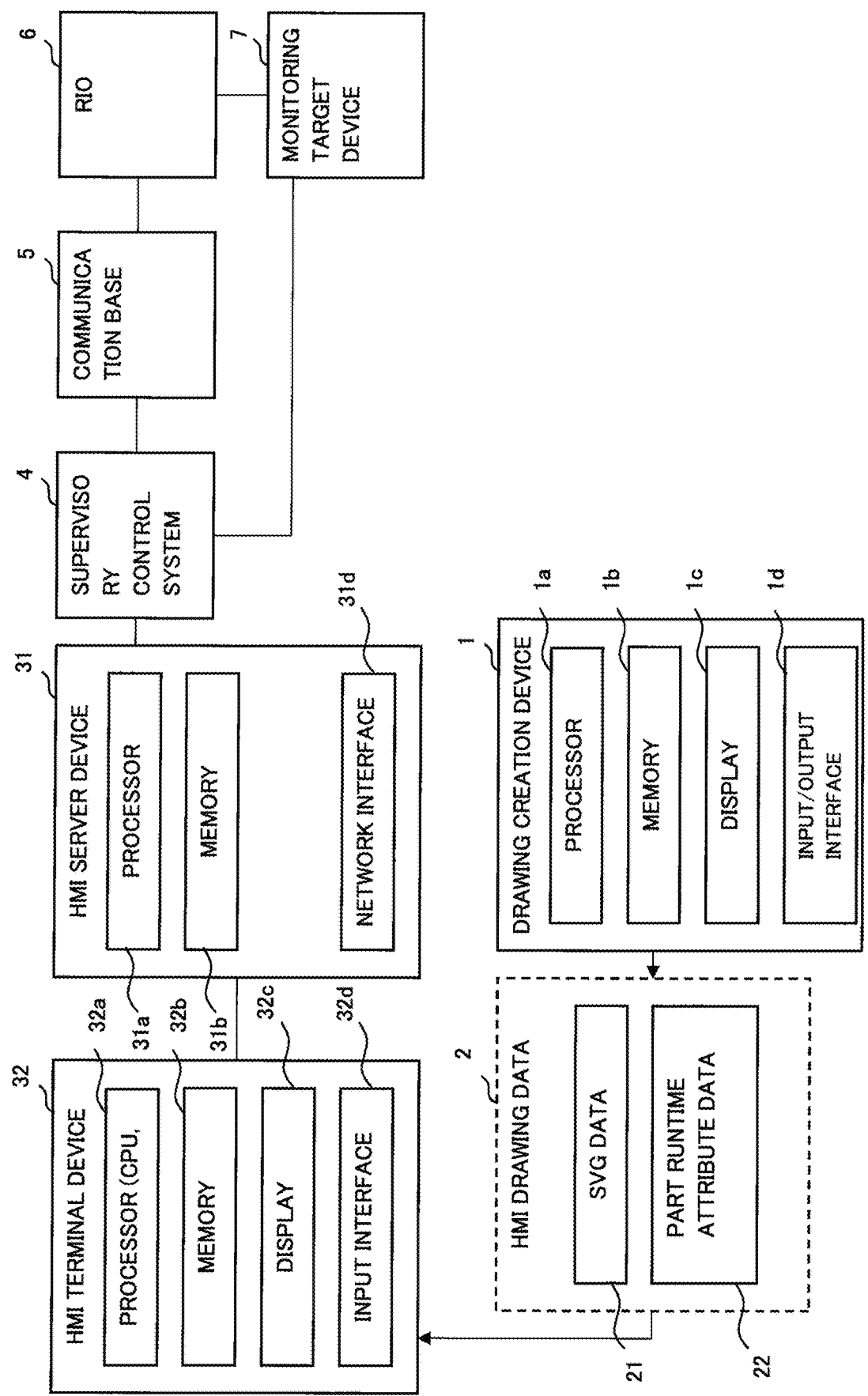
FIG. 6 is a block diagram showing an example of a hardware configuration of a SCADA Web HMI system.

The drafting unit 12 displays side-by-side on a display 1c (FIG. 6), a stencil area where prototypes of parts necessary to create a drawing are arranged and a drafting area where the drawing is rendered. In addition, the drafting unit 12 allows parts in the stencil area which are selected by a developer to be arranged on the drawing in the drafting area by using an input/output interface 1d (FIG. 6).

Part types include, for example, digital input (DI) signal part, analog input (AI) signal part, digital output (DO) signal part, and analog output (AO) signal part.

Each of the parts arranged at a predetermined position on the drawing in the drafting area has static display attributes such as color, shape, position, and size.

The part runtime attribute generation unit 13 automatically generates, when a part is arranged on the drawing in the drafting area, part runtime attribute data specific to the part. Specifically, the part runtime attribute generation unit 13 automatically generates, when a part is arranged, part runtime attribute data in which a specific signal name (item) for associating the part and the monitoring target device 7 and a dynamic display content of the part according to a change of signal data from the monitoring target device 7 are associated with each other. The specific signal name is generated by combining an ID of a screen, a device number in the screen, and a part type. Each part is associated with signal data and a control command via its specific signal name.

For example, the part runtime attribute generation unit 13 automatically generates, when a DI signal part is arranged, part runtime attribute data in which a specific digital signal name for associating the part and the monitoring target device 7 and a display color (color code) of the part when a value of signal data from the monitoring target device 7 changes to OFF are associated with each other.

In addition, the part runtime attribute generation unit 13 automatically generates, when an AI signal part is arranged, part runtime attribute data in which a specific analog signal name for associating the part and the monitoring target device 7 and a display format (for example, "9999.99") for displaying a value of signal data from the monitoring target device 7 are associated with each other.

In order to exert a supervisory control function of the HMI screen, the part runtime attribute data generated for each part on the drawing is read when the HMI subsystem is executed.

The HMI drawing data output unit 14 outputs HMI drawing data 2 that includes SVG data 21 of a drawing where parts rendered in the drafting area are arranged and the part runtime attribute data 22. The SVG data 21 includes, as svg element attributes, static display attributes (color, shape, position, size) of the arranged parts.

<HMI Terminal Device of Hybrid Rendering System>

The HMI terminal device 32 includes the web browser 321, the HMI Web Runtime 322, and a Document Object Model (DOM) 323 in advance.

The web browser 321 reads at least one piece of the SVG data 21 and displays an HMI screen. The HMI screen is configured by combining a plurality of drawings defined by vector data. The drawing in SVG format (SVG data 21) is read by the HMI Web Runtime 322 into the Document Object Model (DOM) 323 which is managed by the web browser 321; and is rendered.

Figure 2:
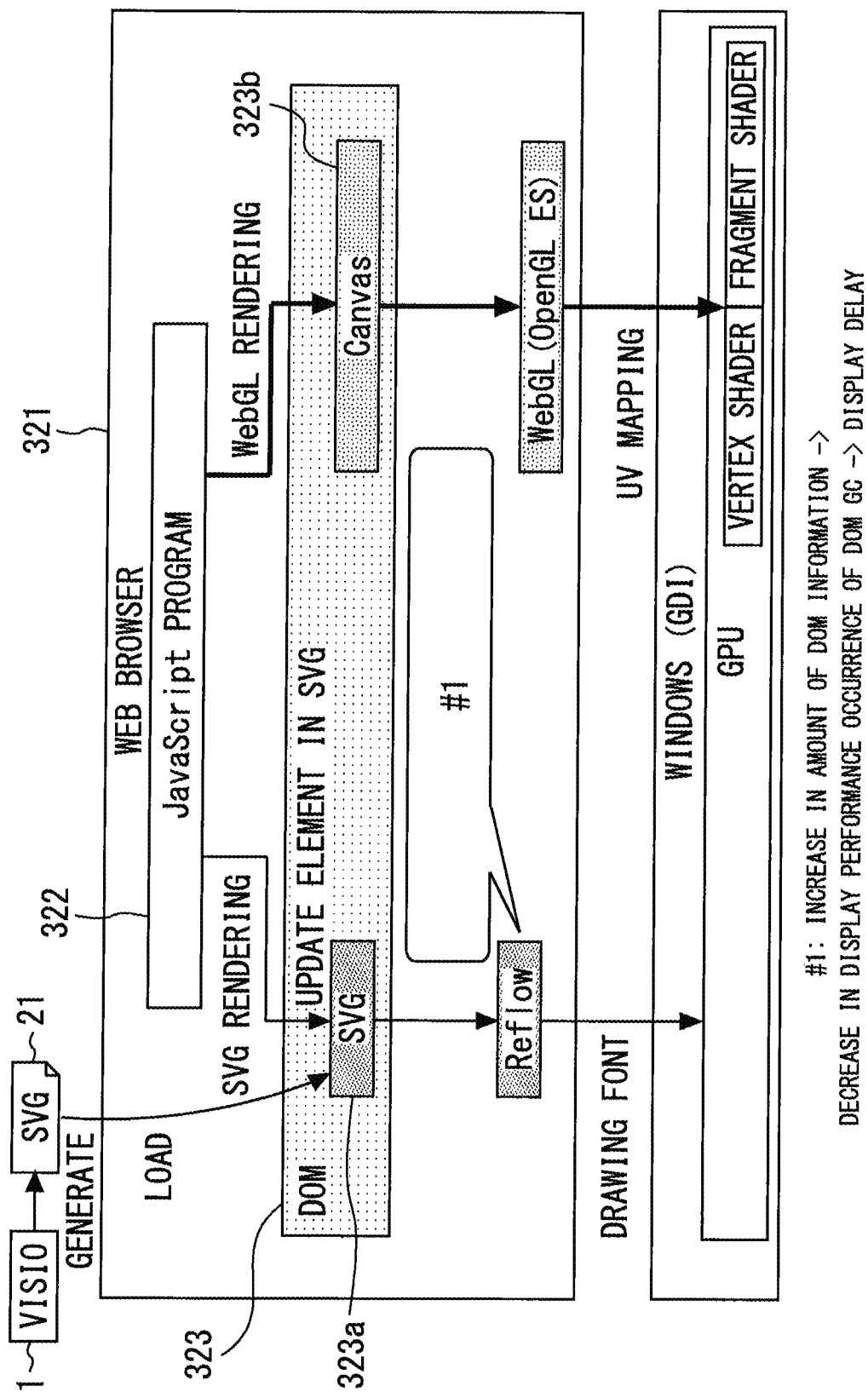
FIG. 2 is a diagram in which display systems of SVG rendering and WebGL rendering are compared.

FIG. 2 is a diagram in which display systems of SVG rendering and WebGL rendering are compared. When the HMI Web Runtime 322 has made a change to an svg element (for example, having changed a color code of a color attribute) within the DOM 323 so as to change the color of a part on the HMI screen, the web browser 321 detects the change and updates the HMI screen. In such SVG rendering, rendering performance decreases in accordance with an increase in the amount of information in the DOM and furthermore, a DOM garbage collection (GC) easily occurs and at the time, a display delay will occur.

A monitoring target device 7 which is to be monitored in the SCADA is operating and changing at a high speed in some cases. In an HMI subsystem there, it is necessary to display, at a high speed, a value of a signal that is output by the monitoring target device 7. However, in a system of the SVG rendering described above, this requirement cannot be met.

In WebGL that performs rendering by directly operating a graphics processing unit (GPU) which is one of the processor 32a, the rendering is performed at a higher speed than in the SVG rendering system. In addition, a DOM GC also does not occur. Therefore, a WebGL rendering system is suitable for a case where a high-speed rendering is required. On the other hand, the SVG data 21 which is generated by the drawing editor 11 having an advanced drawing editing function is so complicated that it is difficult to draw all parts by WebGL rendering (it takes development costs).

Therefore, in the system of this embodiment, a hybrid rendering system in which the SVG rendering and the WebGL rendering are appropriately used is adopted.

Figure 3:
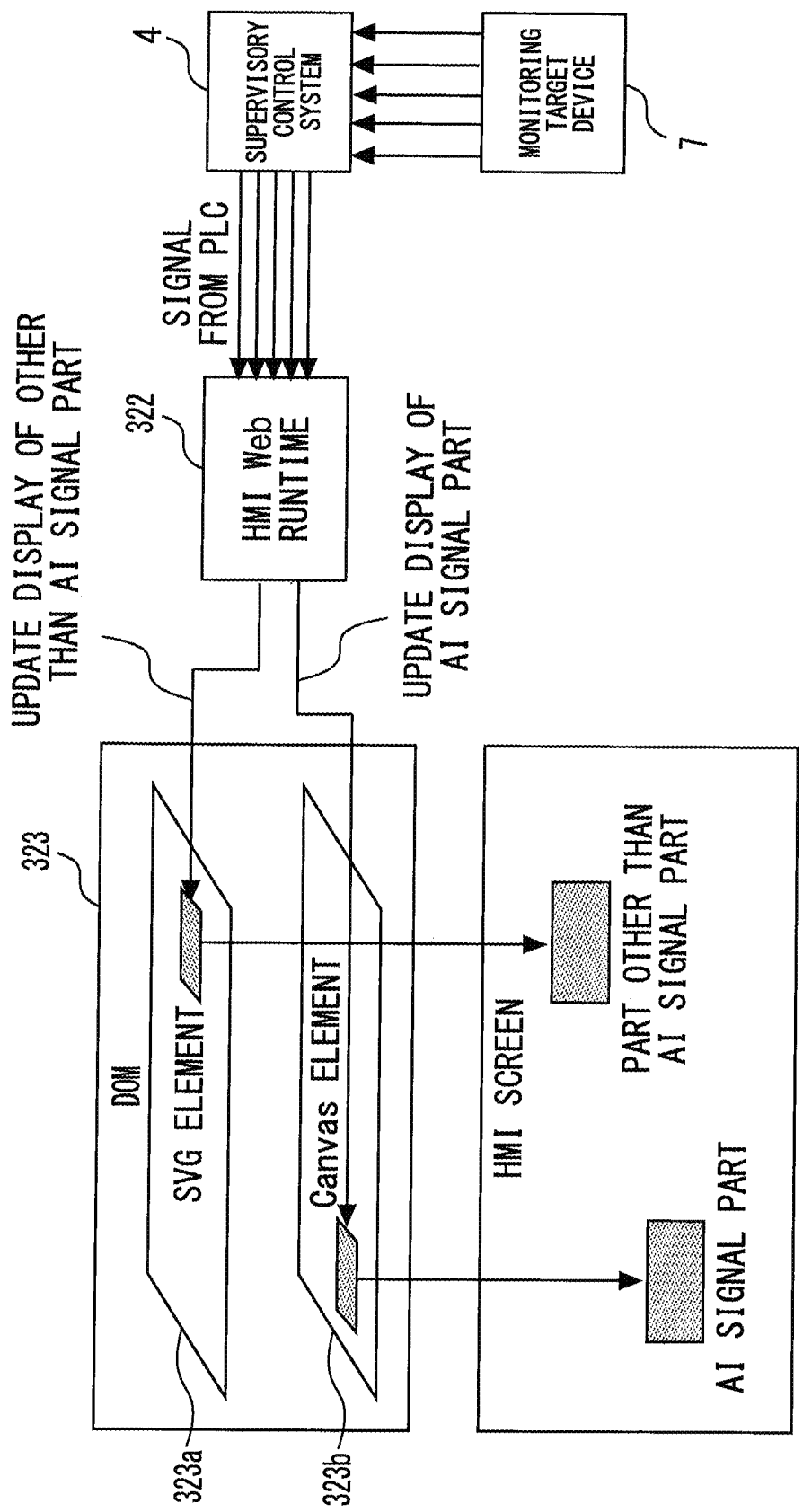
FIG. 3 is a diagram for describing an overview of an HMI terminal device of a hybrid rendering system.

FIG. 3 is a diagram for describing the overview of the HMI terminal device 32 of the hybrid rendering system. A part required to be changed at a high speed in the SCADA system is an AI signal part which indicates analog numerical data. Analog numerical data such as voltage or electrical current constantly fluctuates and it is important to reflect such fluctuations on a screen in real time. Rendering of only the AI signal part by the WebGL rendering conforms to a required specification of the HMI subsystem.

Therefore, in this embodiment, in updating the display of the AI signal part, the AI signal part is rendered using a canvas element 323b of the DOM 323 by the WebGL rendering system. On the other hand, in updating the display of a part other than the AI signal part, an attribute of the svg element 323a in the DOM 323 is updated to render the part by the SVG rendering system.

Figure 4:
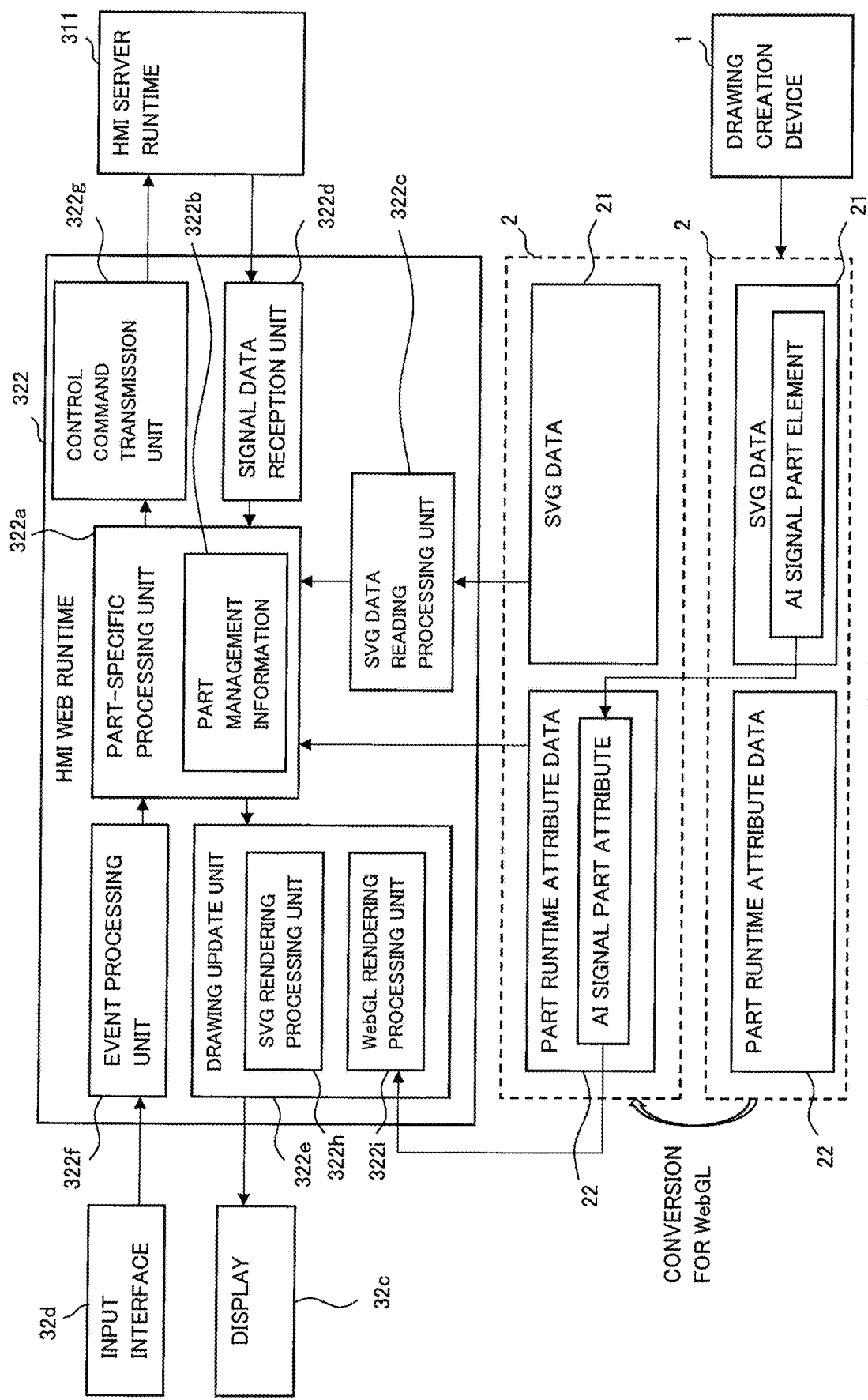
FIG. 4 is a diagram for describing a configuration of an HMI Web Runtime that runs on a web browser of the HMI terminal device.

FIG. 4 is a diagram for describing a configuration of the HMI Web Runtime 322 that runs on the web browser 321 of the HMI terminal device 32. First, pre-processing for the WebGL rendering will be described. In order to perform hybrid rendering, a WebGL rendering processing unit 322i in an HMI Web Runtime module is required.

The WebGL rendering processing unit 322i can use an AI signal part element stored in the SVG data 21 so as to display an AI signal part; however, it is not preferable in terms of performance to access information stored in the DOM. Therefore, information on the AI signal part element is preliminarily deleted from the SVG data 21 and moved to the part runtime attribute data 22. The WebGL rendering processing unit 322i obtains information required for rendering the AI signal part from the part runtime attribute data 22.

Next, the HMI Web Runtime 322 will be described. The HMI Web Runtime 322 reads the HMI drawing data 2 as a setting parameter and runs on the web browser 321. The HMI Web Runtime 322 is a library in which a processing content specific to each part type is predetermined; and specifies one part on the HMI screen based on the read setting parameter and performs processing specific to the part. That is, even for parts of the same type, a setting parameter (for example, a specific signal name) which is set to each of the parts is different and therefore, the operation of each of the parts differs.

The HMI Web Runtime 322 associates a part and a monitoring target device 7 by a setting parameter; and when receiving signal data corresponding to a specific signal name from the monitoring target device 7 via the supervisory control system 4, changes display of the part corresponding to the specific signal name on the HMI screen.

More specifically, the HMI Web Runtime 322 includes a part-specific processing unit 322a, an SVG data reading processing unit 322c, a signal data reception unit 322d, a drawing update unit 322e, an event processing unit 322f, and a control command transmission unit 322g.

The SVG data reading processing unit 322c reads SVG data 21. The part-specific processing unit 322a includes the static display attributes of the SVG data 21 in part management information 322b. The part-specific processing unit 322a reads part runtime attribute data 22 corresponding to each of the parts included in the SVG data 21, and includes it in the part management information 322b.

The part-specific processing unit 322a applies the part management information 322b as a setting parameter to a library (JavaScript (registered trademark) program) in which a processing content specific to each part type is predetermined, so as to make individual parts on the HMI screen function. As an example, specific processing for a DI signal part and an AI signal part will be described.

Specific processing of the DI signal part is such that digital signal data is received from a monitoring target device 7 via the supervisory control system 4 and the display color and shape of the part are changed according to a signal value. Its runtime attributes are a digital signal name, and a display color and shape at a signal OFF time.

Specific processing of the AI signal part is such that analog signal data (analog numerical data) is received from a monitoring target device 7 via the supervisory control system 4 and a value is displayed on the part based on specification of a data display format according to a signal value. Its runtime attributes are an analog signal name and data display format (for example, "9999.99").

The signal data reception unit 322d receives signal data from the monitoring target device 7 via the HMI Server Runtime 311. The part-specific processing unit 322a specifies a part corresponding to the signal data received based on the part management information 322b; and determines an update instruction for part display on the drawing.

For example, as for the DI signal part, when a value of the digital signal data is OFF, an update instruction for changing a color attribute value of the svg element in the DOM to a color code of the color of OFF is issued. As for the AI signal part, an update instruction for displaying a value of the analog signal data in a specified display format is issued. The update instruction is transmitted to the drawing update unit 322e.

The drawing update unit 322e includes an SVG rendering processing unit 322h and the WebGL rendering processing unit 322i.

When signal data from the monitoring target device 7 is data other than analog numerical data, the SVG rendering processing unit 322h renders a part associated with the signal data (for example, DI signal part) by the SVG rendering. The SVG rendering renders the part by updating the svg element 323a in the DOM 323 managed by the web browser 321 and by detecting a change thereof by the web browser 321.

Figure 5:
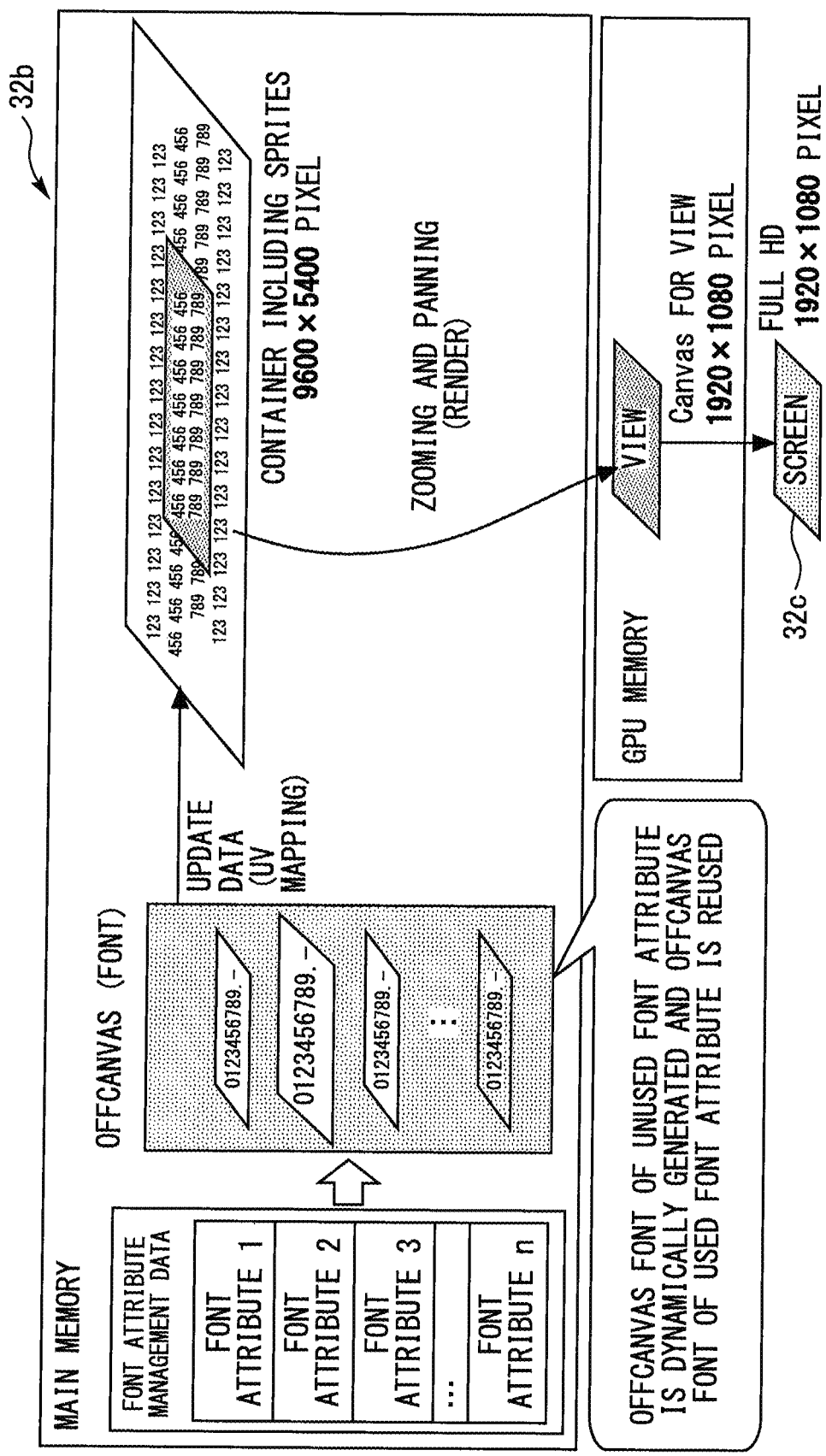
FIG. 5 is a diagram for describing management of font attributes in a WebGL rendering processing unit.

When signal data from the monitoring target device 7 is analog numerical data, the WebGL rendering processing unit 322i renders an AI signal part associated with the signal data by the WebGL rendering. As shown in FIG. 5, the WebGL rendering pre-renders fonts necessary for string representation of numerical data in an offcanvas area (main memory area). Then, it performs rendering by transferring a string representing the analog numerical data from the offcanvas area (main memory area) to the canvas area (GPU memory area) by using a texture mapping (UV mapping) function of WebGL. Thus, a high-speed rendering can be implemented.

This can be used when a content to be rendered is limited to numerical data. In order to display numerical data, it is only necessary to prepare limited fonts such as numbers from 0 to 9, a decimal point, a minus sign, and a space; however, in consideration of variations of font families, font sizes, character colors, background colors, and the like, the number of fonts to be prepared in the offcanvas area increases. Therefore, such a mechanism is realized that manages font attributes used in the WebGL rendering processing unit 322$i$ so as to dynamically generate an offcanvas font of an unused font attribute and reuse an offcanvas font of an used font attribute.

In the WebGL rendering in hybrid rendering, a two-step update process of update of container on the main memory by UV mapping and update of a view area on the GPU memory by render is performed. In an example of FIG. 5, the size of container is secured to be five times larger than the size of a physical screen, both vertically and horizontally. This is for a case where zooming of a screen on the HMI is performed from 1× to 5×. In performing it to nx, it is necessary to secure the size of nx both in vertical direction and a horizontal direction. This is because all images necessary for display is held on the memory, including a case of zooming. In a case where a current zoom level of zooming is assumed to be p ($1 \leq p \leq n$), when an image on container is transferred to the view area on the GPU memory by render, it is transferred with it zoomed out to 1/p.

In a system that does not require a real-time property, such as Web GIS (for example, Google maps (registered trademark)), all images are not held on a memory as described above and re-rendering is performed when zooming or panning occurs. Therefore, in container, it is only required to reserve only a memory of the same size as a physical screen; however, a delay will occur when re-display is performed in zooming or panning.

On the other hand, in a system that requires a real-time property, such as the SCADA HMI, such a delay is not permitted and therefore, all images are allocated on container and in zooming or panning, re-display is completed only by execution of render. As compared with developing font images of all text data into a container area by UV mapping, execution of render is performed at a higher speed. There is also a method of reserving the container area on the GPU memory; in this case, a high-end, high cost graphic processor having a large amount of GPU memory is necessary and therefore, it is more advantageous in cost performance to reserve the container area on the main memory.

Returning to FIG. 4, the description of the HMI Web Runtime 322 will be continued. The event processing unit 322$f$ detects a keyboard or mouse event associated with each part. The part-specific processing unit 322$a$ determines a control command corresponding to the detected event, based on the part management information 322$b$. The control command transmission unit 322$g$ transmits the control command to the HMI Server Runtime 311.

<HMI Server Device>

The HMI Server Runtime 311 runs on the HMI server device 31. Processing of the HMI Server Runtime 311 is as follows.
(1) Incorporates an application server and provides an HMI Web Runtime content to the web browser 321.
(2) Communicates with the supervisory control system 4, transmits signal data from a monitoring target device 7 to the HMI Web Runtime 322, and transmits a control command from the HMI Web Runtime 322 to the supervisory control system 4.

As described above, according to the HMI terminal device of the hybrid rendering system of this embodiment, high-speed rendering is realized for signal data that requires high-speed rendering by caching, on offcanvas, all font images to be used and by holding a whole screen image on container of the main memory also in consideration of zooming. In such a map service as mentioned above, limitations cannot be applied to a zooming level, and the size and type of font to be used and therefore, this technique cannot be applied. However, in the HMI of the supervisory control system, an application to run is specified and a zooming level and the size and type of font to be used can be limited to fixed ranges; and therefore this system can be implemented.

<Hardware Configuration Example>

A hardware configuration of a main part of the SCADA Web HMI system will be described with reference to FIG. 6. FIG. 6 is a block diagram showing an example of the hardware configuration of the SCADA Web HMI system.

Each unit of the drawing creation device 1 illustrated in FIG. 1 indicates a part of functions included in the drawing creation device 1 and each of the functions is implemented by a processing circuit. The processing circuit is constituted by connecting a processor 1$a$, a memory 1$b$, a display 1$c$, and an input/output interface 1$d$. The input/output interface 1$d$ is an input device such as a keyboard or a mouse and a device capable of outputting the HMI drawing data 2 to a file. The processor 1$a$ executes various programs stored in the memory 1$b$ and thereby implements the functions of the units of the drawing creation device 1.

Each unit of the HMI terminal device 32 illustrated in FIG. 1 indicates a part of functions included in the HMI terminal device 32 and each of the functions is implemented by a processing circuit. The processing circuit is constituted by connecting a processor 32$a$, a memory 32$b$, a display 32$c$, and an input interface 32$d$. The processor 32$a$ includes a CPU and a GPU. The memory 32$b$ includes a main memory and a GPU memory. Note that the GPU and the GPU memory may be arranged on a graphic board added to an external slot. The input interface 32$d$ is an input device such as a keyboard or a mouse, and a device capable of reading the HMI drawing data 2. In addition, the processing circuit also includes a network device (not shown) that is connected with the HMI server device 31 and can transmit and receive signal data and a control command. The processor 32$a$ executes various programs stored in the memory 32$b$ and thereby implements the functions of the units of the HMI terminal device 32.

Each unit of the HMI server device 31 illustrated in FIG. 1 indicates a part of functions included in the HMI server device 31 and each of the functions is implemented by a processing circuit. The processing circuit is constituted by connecting a processor 31$a$, a memory 31$b$, and a network interface 31$d$. The network interface 31$d$ is a device that is connected with the supervisory control system 4 and the HMI terminal device 32 and can transmit and receive signal data and a control command. The processor 31$a$ executes various programs stored in the memory 31$b$ and thereby implements the functions of the units of the HMI server device 31.

The embodiment according to the present disclosure has been described above; however, the present disclosure is not limited to the above embodiment and various modifications can be made without departing from the spirit of the present disclosure.

REFERENCE SIGNS LIST

1 Drawing creation device
11 Drawing editor
12 Drafting unit
13 Part runtime attribute generation unit
14 HMI drawing data output unit
2 HMI drawing data
21 SVG data
22 Part runtime attribute data
3 HMI
31 HMI server device
311 HMI Server Runtime
32 HMI terminal device
321 Web browser
322 HMI Web Runtime
323 DOM
323a svg element
323b canvas element
4 Supervisory control system
5 Communication base
6 RIO
7 Monitoring target device
322a Part-specific processing unit
322b Part management information
322c SVG data reading processing unit
322d Signal data reception unit
322e Drawing update unit
322f Event processing unit
322g Control command transmission unit
322h SVG rendering processing unit
322i WebGL rendering processing unit
1a, 31a, 32a Processor
1b, 31b, 32b Memory
1c, 32c Display
1d Input/output interface
31d Network interface
32d Input interface

The invention claimed is:

1. A hybrid rendering HMI terminal device that is connected to a monitoring target device, the hybrid rendering HMI terminal device comprising:
a web browser configured to display an HMI screen on which a first part and a second part are arranged, the first part and the second part representing a state of the monitoring target device that outputs both analog numerical data and digital signal data;
a WebGL rendering processing circuit configured to render the first part by WebGL rendering when signal data from the monitoring target device is analog numerical data, the first part being associated with the signal data, wherein the WebGL rendering processing circuit is further configured to:
secure, in a main memory, all images of the first part corresponding to respective zoom factors;
transfer to a GPU memory an image of the first part corresponding to the zooming factor of the HMI screen out of the all images of the first part secured in the main memory, while reducing the transferring image to an image size necessary to display the HMI screen; and
render the first part corresponding to the reduced image transferred to the GPU memory; and
an SVG rendering processing circuit configured to render the second part by SVG rendering when the signal data from the monitoring target device is digital signal data, the second part being associated with the signal data.

2. The hybrid rendering HMI terminal device according to claim 1, wherein
the WebGL rendering renders the first part by pre-rendering, in an offcanvas area, fonts necessary for string representation of numerical data and transferring a string representing the analog numerical data from the offcanvas area to a canvas area by using a texture mapping function of WebGL; and
the SVG rendering renders the second part by updating an svg element in a DOM managed by the web browser.

3. The hybrid rendering HMI terminal device according to claim 1, wherein
the analog numerical data is voltage data or electrical current data.

4. The hybrid rendering HMI terminal device according to claim 1, wherein the analog numerical data is only rendered by the WebGL rendering processing circuit.

5. The hybrid rendering HMI terminal device according to claim 4, wherein digital signal data is rendered only using the SVG rendering processing circuit.

6. A hybrid rendering HMI terminal device that is connected to a monitoring target device, the hybrid rendering HMI terminal device comprising:
a display configured to display a web browser;
a processor configured to execute a program; and
a memory that stores the program, the program performing, when being executed by the processor, processing of:
displaying an HMI screen on the web browser, a first part and a second part being arranged on the HMI screen, the first part and the second part representing a state of the monitoring target device that outputs both analog numerical data and digital signal data;
rendering the first part by WebGL rendering when signal data from the monitoring target device is analog numerical data, the first part being associated with the signal data; and
rendering the second part by SVG rendering when the signal data from the monitoring target device is digital signal data, the second part being associated with the signal data, wherein,
the memory includes a main memory and a GPU memory, and
in the WebGL rendering processing, the processor is configured to:
secure, in the main memory, all images of the first part corresponding to respective zoom factors;
when the HMI screen is zoomed, reduce an image of the first part corresponding to the zooming factor of the HMI screen out of the all images of the first part secured in the main memory to an image size necessary to display the HMI screen and transfer the reduced image of the first part to the GPU memory; and
render the first part corresponding to the reduced image transferred to the GPU memory.

7. The hybrid rendering HMI terminal device according to claim 6, wherein
the WebGL rendering renders the first part by pre-rendering, in an area on the main memory, fonts necessary for string representation of the numerical data and transferring a string representing the analog numerical data from the area to the GPU memory by using a texture mapping function of WebGL: and the SVG rendering renders the second part by updating an svg element in a DOM managed by the web browser on the main memory.

8. The hybrid rendering HMI terminal device according to claim 6, wherein the analog numerical data is voltage data or electrical current data.

9. The hybrid rendering HMI terminal device according to claim 6, wherein the analog numerical data is rendered only using WebGL rendering.

10. The hybrid rendering HMI terminal device according to claim 9, wherein the digital signal data is rendered only using SVG rendering.

11. A processor for use with a hybrid rendering HMI terminal device that is connected to a monitoring target device, the HMI terminal device including a display configured to display a web browser, the processor being configured to:

display an HMI screen on the web browser, a first part and a second part being arranged on the HMI screen, the first part and the second part representing a state of the monitoring target device that outputs both analog numerical data and digital signal data;

render the first part by WebGL rendering when signal data from the monitoring target device is analog numerical data, the first part being associated with the signal data; and render the second part by SVG rendering when the signal data from the monitoring target device is digital signal data, the second part being associated with the signal data, wherein, in the WebGL rendering processing, the processor is configured to:

secure, in a main memory, all images of the first part corresponding to respective zoom factors;

when the HMI screen is zoomed, reduce an image of the first part corresponding to the zooming factor of the HMI screen out of the all images of the first part secured in the main memory to an image size necessary to display the HMI screen and transfer the reduced image of the first part to the GPU memory; and render the first part corresponding to the reduced image transferred to the GPU memory.

* * * * *